L. S. LACHMAN.
PROCESS OF ELECTRIC WELDING.
APPLICATION FILED MAY 8, 1907.
1,020,991.
Patented Mar. 26, 1912.
2 SHEETS—SHEET 2.
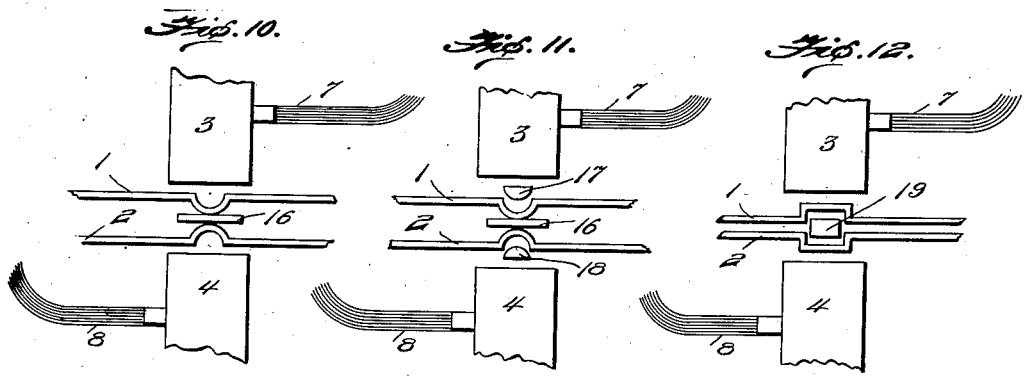
Witnesses
Inventor
Laurence S. Lachman,
Dickerson, Brown, Raegener & Binney
Attorneys

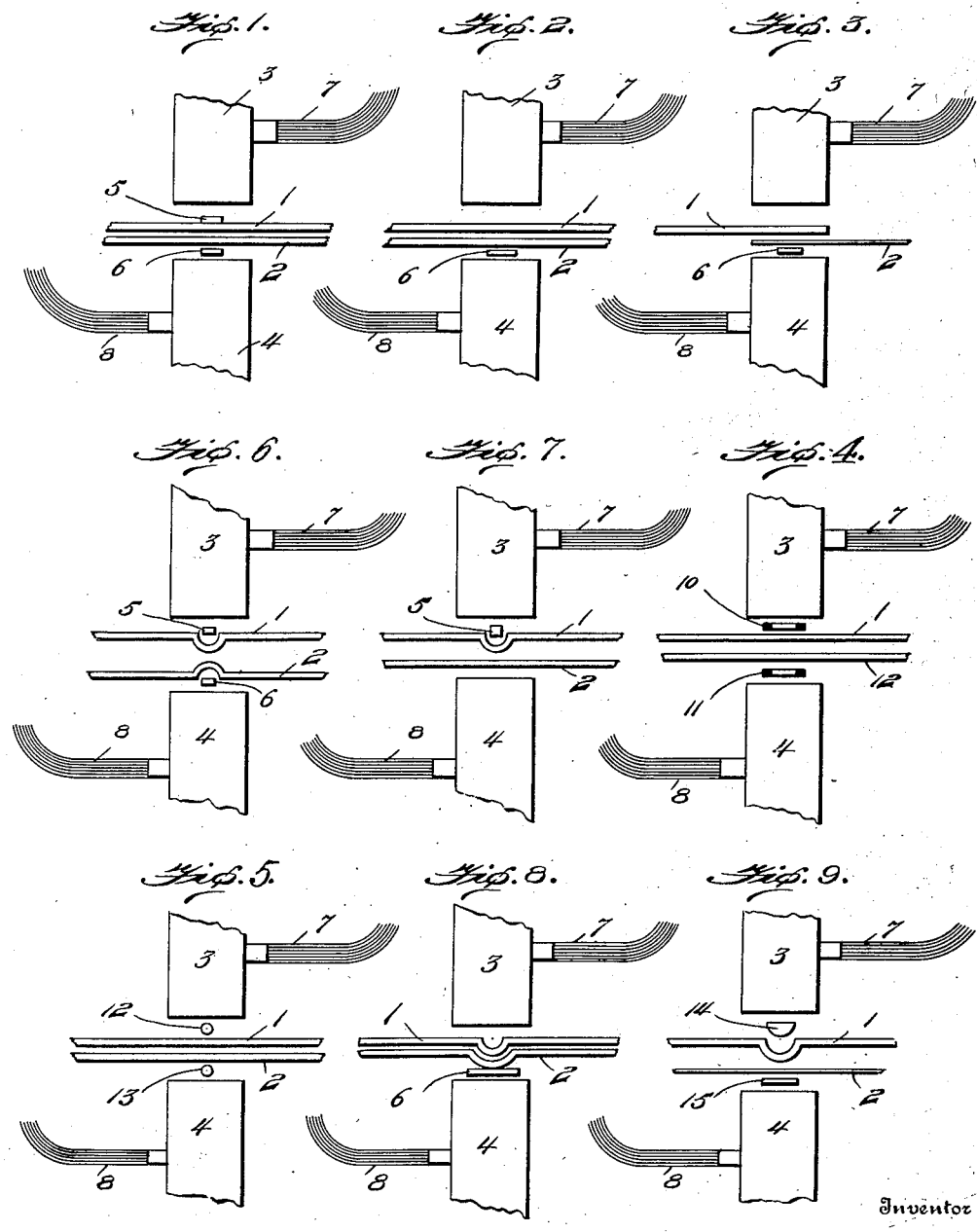

UNITED STATES PATENT OFFICE.

LAURENCE S. LACHMAN, OF NEW YORK, N. Y.

PROCESS OF ELECTRIC WELDING.

1,020,991.      Specification of Letters Patent.      Patented Mar. 26, 1912.

Application filed May 8, 1907. Serial No. 372,506.

*To all whom it may concern:*

Be it known that I, LAURENCE S. LACHMAN, a citizen of the United States, residing in the borough of Manhattan, city, county, and State of New York, have invented certain new and useful Improvements in Processes of Electric Welding; and I do hereby declare the following to be a full, clear, and exact description of the same, such as will enable others skilled in the art to which it appertains to make and use the same.

My invention relates to a method of electrically welding two metal bodies together by a weld localized in a portion of their abutting or meeting portions, all as more particularly herein set forth and claimed.

The invention affords a means of uniting, among other things, two metal bodies of comparatively large surface area, such as metal plates, by a localized or spot weld or welds made by welding the meeting surfaces or portions directly to one another by the material of the plates and without necessarily previously preparing or forming the plates or pieces in any special manner for the purpose of the welding operation, and in a manner which permits the operator to definitely and easily determine the exact location of the weld in the concealed meeting surfaces or portions of the pieces.

My invention consists in the methods or processes hereinafter described and then specified in the claims.

In the accompanying drawings I have shown means and material for carrying out the process of my invention, the material being shown, for the sake of illustration only, as comprising plates of metal.

Figure 1 shows a pair of plates as assembled between welding electrodes for union at a spot or localized portion of their meeting surfaces by the use of two pressure localizing pieces, according to my invention. Fig. 2 shows as a modification the use of but one localizing piece. Fig. 3 shows the application of the invention to the uniting of two plates or pieces, one of which is thinner than the other. Fig. 4 illustrates the invention as carried out by using heat and pressure localizing pieces applied according to my invention, but of a ring form instead of the disk or other imperforate form illustrated in the previous figures. Fig. 5 shows heat and pressure localizing pieces of still another form.

For the sake of clearness the plates or pieces 1, 2, and the electrodes 3, 4, are shown as separated, but in practice and during the operation of welding, according to my invention, it will be understood that the plates 1, 2, are in surface contact with one another and the electrodes are engaged with the welding pieces 5, 6, which in turn engage the back or backs of the two plates or pieces 1, 2.

It will be further understood that the electrodes 3, 4, are furnished with heating current of suitable volume for the electric welding operation by the conductors 7, 8, connected thereto, and that associated with them are proper means for applying a suitable welding pressure. Assuming that the plates 1, 2, of Fig. 2, for instance, are to be united by an electric weld in their meeting surfaces in accordance with my invention, the said plates are superposed on one another between welding jaws or electrodes 3, 4, and the workman applies at the back of one of them the welding piece 6 at the exact location at which it is desired to form the weld between their meeting surfaces. Said welding piece 6 is of a form and size dependent upon the form and size of the localized weld desired. Upon the application of the pressure through the welding electrodes 3, 4, and the passage of the heating current, the plates are forced together and the piece 6 is forced against the back surface of the plate 2. The effect of the pressure as modified by the presence of the piece 6 is to localize the welding pressure and the flow of current in the meeting surfaces of the plates 1, 2, beneath or opposite the piece 6, and the continuance of current and pressure for the desired interval will result in the formation of an effective welding of the material of the plane faces of the plates 1, 2, to one another by a weld of an area and form practically conforming to the piece 6.

As will be seen, the method permits the pieces 1, 2, to meet fully or as may be desired on their opposed faces without interference, while nevertheless they become fully united by the localized electric weld.

The application of the pressure and current will further have the effect of causing the piece 6, which in most cases also becomes heated, to be firmly incorporated in the back surfaces of the plate to which it is applied.

While I show my invention in Fig. 2 as carried out by the use of one pressure and heat localizing piece, it is obvious that pieces might be applied in a similar way to the back of both bodies or plates of metal 1, 2. This I have shown in Fig. 1, where the piece 5 is shown in engagement with the back surface of the plate 1.

Fig. 3 shows a slight modification in the application of my invention, the union to be effected being in this instance what is technically known as a lap union and one of the pieces being thinner than the other. In this case the heating and pressure localized piece is preferably applied to the back of the thinner piece 2.

Fig. 4 illustrates the use of weld pieces 10, 11, of ring form, which may be thus employed for forming an annular localized weld in the meeting surfaces of the bodies 1, 2.

Fig. 5 simply shows that the weld pieces 12, 13, may be of spherical form or a form which will restrict the area of initial contact of the parts and cause the heating to begin in a spot of small area, which however will gradually extend.

In all these modifications of carrying out my invention it will be seen that the operation is substantially the same and involves simply the assemblage of the two bodies or plates which are to be welded in the desired relation without necessarily any previous preparation for the welding operation and the passage of an electric current from one to the other of the pieces, which is however localized in the meeting surfaces by pressure communicated to the body of the piece from an exterior piece applied at the back of the plate or body at the exact location of the weld and in the form desired, said exterior piece receiving the pressure and electrical contact of the jaw or electrode 3 or 4 and transmitting the pressure through the plate or piece 1, 2, to the inner surface thereof, at the location where the welding of the surfaces directly to one another is to be effected, the action being further accompanied by a localization of the flow of current in the line joining the electrodes, the welding piece or pieces and the interior surfaces of the bodies 1, 2, in line with them.

In practicing my invention, it is obvious that any usual appliances for controlling the pressure and flow of current may be used. In the operation it will be found that the welding current, in passing through the weld piece, readily heats it to welding condition owing to its comparatively small cross-section and its small area of contact with the pole and the plate. Under the influence of the pressure the weld pieces, on assuming the plastic condition, will ordinarily sink down into the body of the metal and when they have reached its general level the electrodes will engage the plates by their whole flat end and the heating will in a measure diminish; but the rush of current at any stage of the operation can be obviously controlled in the ordinary manner by the use of circuit breakers.

In carrying out my invention, the weld pieces may be and preferably are of the same metal as the articles or bodies to be united and may be of any shape desired, as for instance wire, cube, ring or any other form that convenience may dictate. Copper and steel can be united in the manner described, the weld piece being preferably steel. Steel and silver can also be similarly united, as may many other pairs of dissimilar metals. Aluminum can be welded to aluminum; zinc to zinc and many other metals usually considered non-weldable can be united in the manner described.

In the foregoing description it is to be understood that the union of steel to steel has been considered as having been effected by the operation and apparatus shown and described, and similarly as to the following description of the remaining figures.

Figs. 6, 7, 8, 9, 10, 11 and 12 illustrate modifications of my invention which involve providing the metal plates with protuberances struck up from the flat of the metal, said protuberances being preferably provided on both plates unless one is markedly thinner than the other. The protuberances are caused to engage either point to point or point to socket, though with one thin sheet, the thicker sheet only need be provided with the protuberance. The additional small piece of metal is shown in these cases as located opposite the protuberance, so that upon passage of the current the whole amount must flow through the comparatively small cross-section thereof as well as through the portions of the protuberances on the plates which engage.

Some of the weld pieces are shown as cubical in form, others as semi-cylindrical. The figures are self-explanatory to such an extent that no further description is required other than perhaps to state that the current passing through the protuberances and the weld pieces heats the parts, the heating being assisted by the limited area of contact of the protuberances with one another or with an opposite plate and by the limited contact in some cases of the weld pieces with the protuberances.

What I claim as my invention is:

1. The herein described method of forming a localized weld between the meeting portions of superposed plates of metal consisting in assembling the plates in the desired relation, superposing a welding piece on the assembled plates and in position over the place of desired union, and applying pressure to said piece and passing heating current into the same and through the plates to localize the flow of current and heating in the engaged surfaces of the plates.

2. The herein described method of uniting two superposed pieces of metal by a weld localized in their meeting surfaces, consisting in applying an external heat and pressure localizing piece to said pieces, compressing the three pieces between two welding electrodes, and passing electric current from one electrode to the other through the three pieces.

3. The method of uniting metal plates face to face by a localized weld in their meeting surfaces, consisting of superposing the plates and pressing them together between two electrodes and an exterior welding piece applied at the back of a plate and located in position over the point at which it is desired to localize the weld and passing welding current from one electrode to the other.

4. The method of uniting two pieces of metal face to face by a union localized in the material of their meeting faces consisting of superposing them in the desired relation, applying welding pieces at the back of said plates in line with the portion of their meeting surfaces at which it is desired to form said weld, and compressing the pieces while passing electric current through them all in the line of the welding pressure and locality of the weld.

5. The process of producing welds which consists in providing a body of metal with a protuberance proximating said body of metal with another body of metal with a protuberance, placing at least one weld piece of relatively small cross-section in contact with at least one of said metal bodies at the point where the protuberances are formed, and passing a welding current from a pair of poles through such assemblage of metal and weld piece until the metal and weld piece coalesce to form a spot weld.

6. The process of producing welds which consists in providing a body of metal with a hollow protuberance, proximating said body of metal with another body of metal with a hollow protuberance, the protuberance of said bodies of metal being nested, placing at least one weld piece of relatively small cross-section in contact with at least one of said metal bodies at the point where the protuberances are formed, and passing a welding current from a pair of poles through such assemblage of metal and weld piece until the metal and weld piece coalesce to form a spot weld.

In testimony whereof I have signed this specification in the presence of two subscribing witnesses.

LAURENCE S. LACHMAN.

Witnesses:
Leo J. Matty,
H. M. Marble.